(12) United States Patent
Kobayashi et al.

(10) Patent No.: US 7,484,855 B2
(45) Date of Patent: Feb. 3, 2009

(54) IMAGE PROCESSING SYSTEM, PROJECTOR, COMPUTER-READABLE MEDIUM AND IMAGE PROCESSING METHOD

(75) Inventors: Masanobu Kobayashi, Shiojiri (JP); Hideki Matsuda, Fujimi-machi (JP); Osamu Wada, Ina (JP)

(73) Assignee: Seiko Epson Corporation, Tokyo (JP)

( * ) Notice: Subject to any disclaimer, the term of this patent is extended or adjusted under 35 U.S.C. 154(b) by 483 days.

(21) Appl. No.: 11/295,451

(22) Filed: Dec. 7, 2005

(65) Prior Publication Data

US 2006/0158623 A1 Jul. 20, 2006

(30) Foreign Application Priority Data

Jan. 17, 2005 (JP) ............................. 2005-008740

(51) Int. Cl.
*G03B 21/00* (2006.01)
(52) U.S. Cl. ........................................ 353/122; 353/69
(58) Field of Classification Search .................. 353/30, 353/69, 70, 122; 348/806, 807; 345/207
See application file for complete search history.

(56) References Cited

U.S. PATENT DOCUMENTS

| 6,927,784 | B2 * | 8/2005 | Matsuda et al. ............. 345/690 |
| 6,939,011 | B2 * | 9/2005 | Kobayashi ................... 353/69 |
| 7,165,844 | B2 * | 1/2007 | Kobori et al. ................. 353/30 |
| 2004/0150801 | A1 * | 8/2004 | Kitada et al. ................. 353/122 |

FOREIGN PATENT DOCUMENTS

| JP | A 2001-109422 | 4/2001 |
| JP | A 2005-038388 | 2/2005 |

* cited by examiner

*Primary Examiner*—Hung Henry Nguyen
(74) *Attorney, Agent, or Firm*—Oliff & Berridge, PLC (57) ABSTRACT

A projector including: an adjustment section which generates edit image information for projecting an edit image including a content image based on input image information and a position change detection image at least partially provided outside the content image; a sensing section which senses a screen onto which the edit image is projected and generates sensing information indicating a sensed image; a projection section which projects the edit image based on the edit image information; and a determination section which determines whether or not a relative position between the projection section and the screen has changed based on the sensing information.

9 Claims, 10 Drawing Sheets

IMAGE PROCESSING SYSTEM, PROJECTOR, COMPUTER-READABLE MEDIUM AND IMAGE PROCESSING METHOD

Japanese Patent Application No. 2005-8740, filed on Jan. 17, 2005, is hereby incorporated by reference in its entirety.

BACKGROUND OF THE INVENTION

The present invention relates to an image processing system, a projector, a program, an information storage medium, and an image processing method capable of detecting a change in the relative position between a projection target and a projector based on sensing information.

In recent years, a projector including a CCD camera has been proposed which projects an image onto a projection target such as a screen, senses the projected image by using the CCD camera, and performs calibration processing such as image distortion correction.

However, such a projector cannot display an appropriate image when the relative position between the projector and the screen is changed after calibration processing, such as when the user accidentally collides with the projector or when the user hits the screen using a pointer.

In this case, since the user believes that an appropriate image is displayed by the calibration processing, the user may not become aware that an appropriate image is not displayed.

In order to solve such a problem, the projector must detect a change in the relative position between the projector and the screen.

JP-A-2001-109422 discloses a projector which stores sensing data obtained by using a CCD camera in a frame memory and detects the movement of the image from a change in the content of the frame memory.

An ordinary movement detection method using a camera detects movement by comparing sensing data at a time "t" stored in a memory with sensing data at a time "t+1".

However, since an ordinary movement detection method requires that sensing data before one time unit be stored, the memory utilization efficiency is decreased. Moreover, the sensing data comparison processing is complicated.

Moreover, even if the user has become aware that the relative position between the projector and the screen has changed, the projector must again perform the calibration processing.

SUMMARY

According to a first aspect of the invention, there is provided an image processing system, comprising:

an adjustment section which generates edit image information for projecting an edit image including a content image based on input image information and a position change detection image at least partially provided outside the content image;

a sensing section which senses a projection target onto which the edit image is projected and generates sensing information indicating a sensed image;

a projection section which projects the content image based on the input image information and projects the edit image based on the edit image information; and a determination section which determines whether or not a relative position between the projection section and the projection target has changed based on the sensing information, the determination section determining whether or not the relative position has changed by determining the presence or absence of the position change detection image in a projection target area corresponding to the projection target in the sensed image.

According to a second aspect of the invention, there is provided a projector comprising the above-described image processing system.

According to a third aspect of the invention, there is provided a computer-readable medium comprising a computer program executed by a computer, the computer including a sensing section, a projection section, and a determination section, the program causing the computer to perform processing for:

the projection section to project an image including a position change detection image at least partially provided outside a content image based on input image information;

the sensing section to sense a projection target onto which the image is projected and to generate sensing information indicating a sensed image; and the determination section to determine whether or not a relative position between the projection section and the projection target has changed based on the sensing information, the sensing section sensing the projection target in a sensing range including the projection target area; and the determination section determining whether or not the relative position has changed by determining the presence or absence of the position change detection image in a projection target area corresponding to the projection target in the sensed image.

According to a fourth aspect of the invention, there is provided an information storage medium storing a computer-readable program, the computer-readable program being the above-described program.

According to a fifth aspect of the invention, there is provided an image processing method, comprising:

projecting an image including a position change detection image at least partially provided outside a content image based on input image information;

sensing a projection target onto which the image is projected and generating sensing information indicating a sensed image; and determining whether or not a relative position between a projection section and the projection target has changed based on the sensing information, sensing the projection target in a sensing range including the projection target area; and determining whether or not the relative position has changed by determining the presence or absence of the position change detection image in a projection target area corresponding to the projection target in the sensed image.

DETAILED DESCRIPTION OF THE EMBODIMENT

The invention may provide an image processing system, a projector, a program, an information storage medium, and an image processing method capable of simply and promptly detecting a change in the relative position between a projection target and a projection section.

According to one embodiment of the invention, there is provided an image processing system, comprising:

an adjustment section which generates edit image information for projecting an edit image including a content image based on input image information and a position change detection image at least partially provided outside the content image;

a sensing section which senses a projection target onto which the edit image is projected and generates sensing information indicating a sensed image;

a projection section which projects the content image based on the input image information and projects the edit image based on the edit image information; and a determination section which determines whether or not a relative position between the projection section and the projection target has changed based on the sensing information, the determination section determining whether or not the relative position has changed by determining the presence or absence of the position change detection image in a projection target area corresponding to the projection target in the sensed image.

According to one embodiment of the invention, there is provided a projector comprising the above-described image processing system.

According to one embodiment of the invention, there is provided a program readable by a computer including a sensing section, a projection section, and a determination section, the program causing the computer to perform processing for:

the projection section to project an image including a position change detection image at least partially provided outside a content image based on input image information;

the sensing section to sense a projection target onto which the image is projected and to generate sensing information indicating a sensed image; and the determination section to determine whether or not a relative position between the projection section and the projection target has changed based on the sensing information, the sensing section sensing the projection target in a sensing range including the projection target area; and the determination section determining whether or not the relative position has changed by determining the presence or absence of the position change detection image in a projection target area corresponding to the projection target in the sensed image.

According to one embodiment of the invention, there is provided an information storage medium storing a computer-readable program, the computer-readable program being the above-described program.

According to one embodiment of the invention, there is provided an image processing method conducted by a computer including a sensing section, a projection section, and a determination section, wherein:

the projection section projects an image including a position change detection image at least partially provided outside a content image based on input image information;

the sensing section senses a projection target onto which the image is projected and generates sensing information indicating a sensed image; and the determination section determines whether or not a relative position between the projection section and the projection target has changed based on the sensing information, the sensing section senses the projection target in a sensing range including the projection target area; and the determination section determines whether or not the relative position has changed by determining the presence or absence of the position change detection image in a projection target area corresponding to the projection target in the sensed image.

According to these embodiments of the invention, the image processing system etc. can simply and promptly detect a change in the relative position between the projection target and the projection section by projecting the position change detection image in addition to the normal content image and determining the presence or absence of the position change detection image in the projection target area.

In each of the image processing system, the projector, the program, the information storage medium, and the image processing method, the position change detection image may be provided at top, bottom, right, and left outside the content image; and the determination section may determine at least one of a moving direction and an amount of movement of the relative position based on a detection state of the position change detection image in the sensed image.

This enables the image processing system etc. to appropriately detect the moving direction of the projection target or the like by providing the position change detection image at the top, bottom, right, and left outside the content image.

Each of the image processing system, the projector, the program, the information storage medium, and the image processing method may comprise:

a projection target area information generation section which generates projection target area information on a position of the projection target area in the sensed image based on a difference in image signal value in pixel units in the sensed image, wherein the determination section determines whether or not the relative position has changed based on the sensing information and the projection target area information.

This enables the image processing system etc. to detect a relative change by appropriately determining the projection target area.

In each of the image processing system, the projector, the program, the information storage medium, and the image processing method, when the determination section has determined that the relative position has changed, the adjustment section may adjust at least one of a correction amount of the input image information and a control amount of a projection control section included in the projection section based on the determination result of the determination section.

This enables the image processing system etc. to project an appropriate image corresponding to a change in the relative position without again performing the calibration processing.

Each of the image processing system, the projector, the program, the information storage medium, and the image processing method may comprise:

a projection area information generation section which generates projection area information on a position of a projection area corresponding to the image in the sensed image based on the difference in the image signal value in pixel units in the sensed image; and a correction value deriving section which derives a correction value for distortion of the image on the projection target based on the projection target area information and the projection area information, wherein the adjustment section adjusts at least one of the correction amount and the control amount based on the correction value so that distortion of the image is corrected.

This enables the image processing system etc. to project an appropriate undistorted image corresponding to a change in the relative position without again performing the calibration processing.

Each of the image processing system, the projector, the program, the information storage medium, and the image processing method may comprise:

a notification section which notifies a user that the relative position has changed by using at least one of an image, sound, and light when the determination section has determined that the relative position has changed.

This enables the image processing system etc. to notify the user that the relative position has changed.

These embodiments of the invention are described below with reference to the drawings, taking the application of this invention to a projector capable of detecting a change in the relative position between a projection target and a projection section as an example of the use thereof. Note that the embodiments described below do not in any way limit the scope of the invention laid out in the claims herein. In addition, not all of the elements of the embodiments described below should be taken as essential requirements of the invention.

First Embodiment

Figure 1:
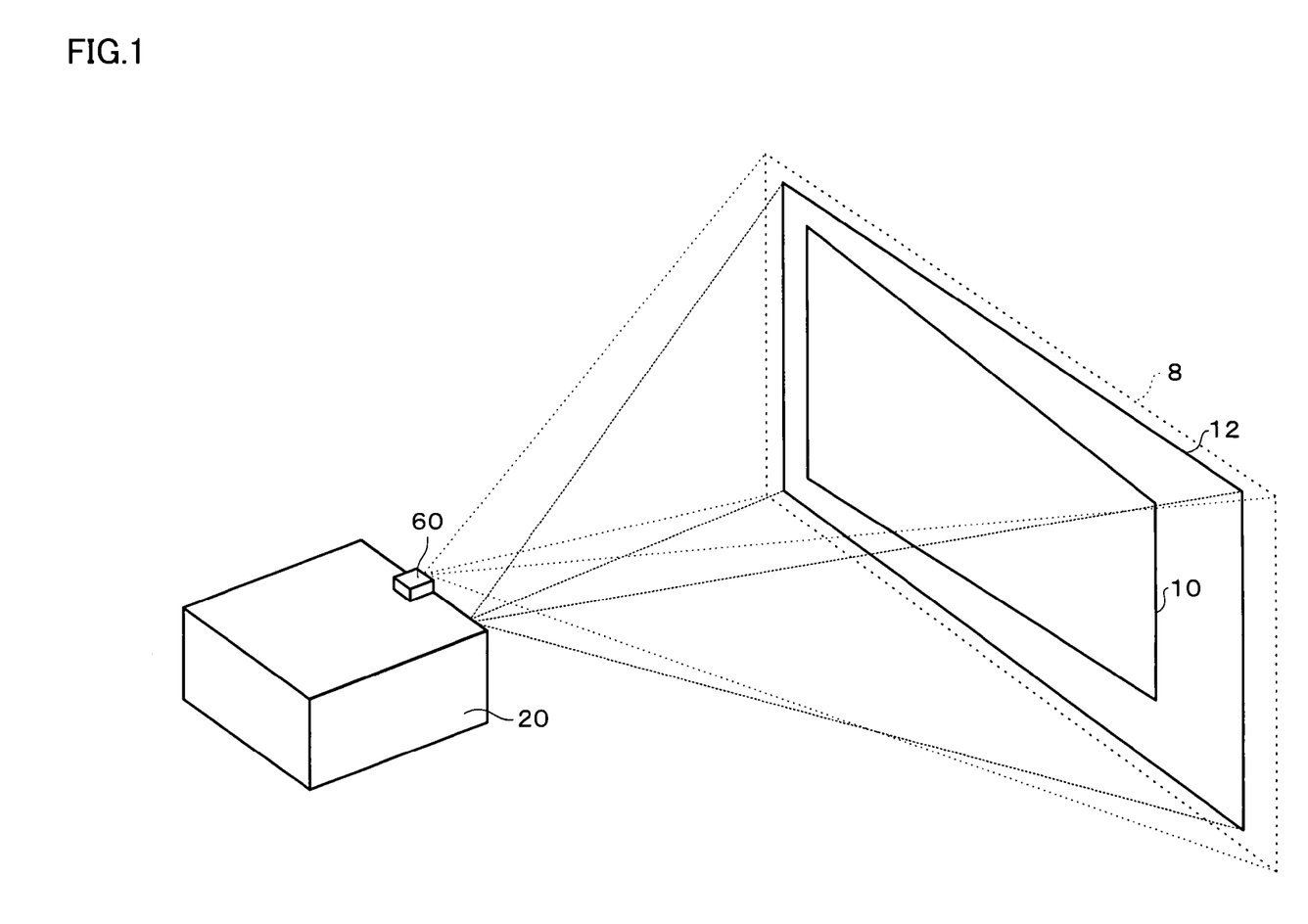
FIG. 1 is a schematic diagram showing an image projection state according to a first embodiment.

FIG. 1 is a schematic diagram showing an image projection state in a first embodiment.

A projector 20 including an image processing system projects an image onto a screen 10 which is one type of projection target. In the first embodiment, the projector 20 is not positioned perpendicularly to the screen 10. A projected image 12 formed by projection light from the projector 20 is partially positioned outside the screen 10. In the first embodiment, a sensor 60, which is a part of a sensing section, senses the screen 10 in a sensing range 8 including the projected image 12.

In the first embodiment, the projector 20 calculates the aspect ratio (height/width ratio) of the screen 10 based on sensing information generated by the sensor 60. The projector 20 corrects image distortion based on the calculated aspect ratio and a known desired aspect ratio so that a content image included in the projected image 12 is positioned inside the screen 10 and has the desired aspect ratio.

The projector 20 according to the first embodiment detects a change in the relative position between the screen 10 and the projector 20 after performing calibration processing such as distortion correction as described above.

Functional blocks of the projector 20 for implementing such a function are described below.

Figure 2:
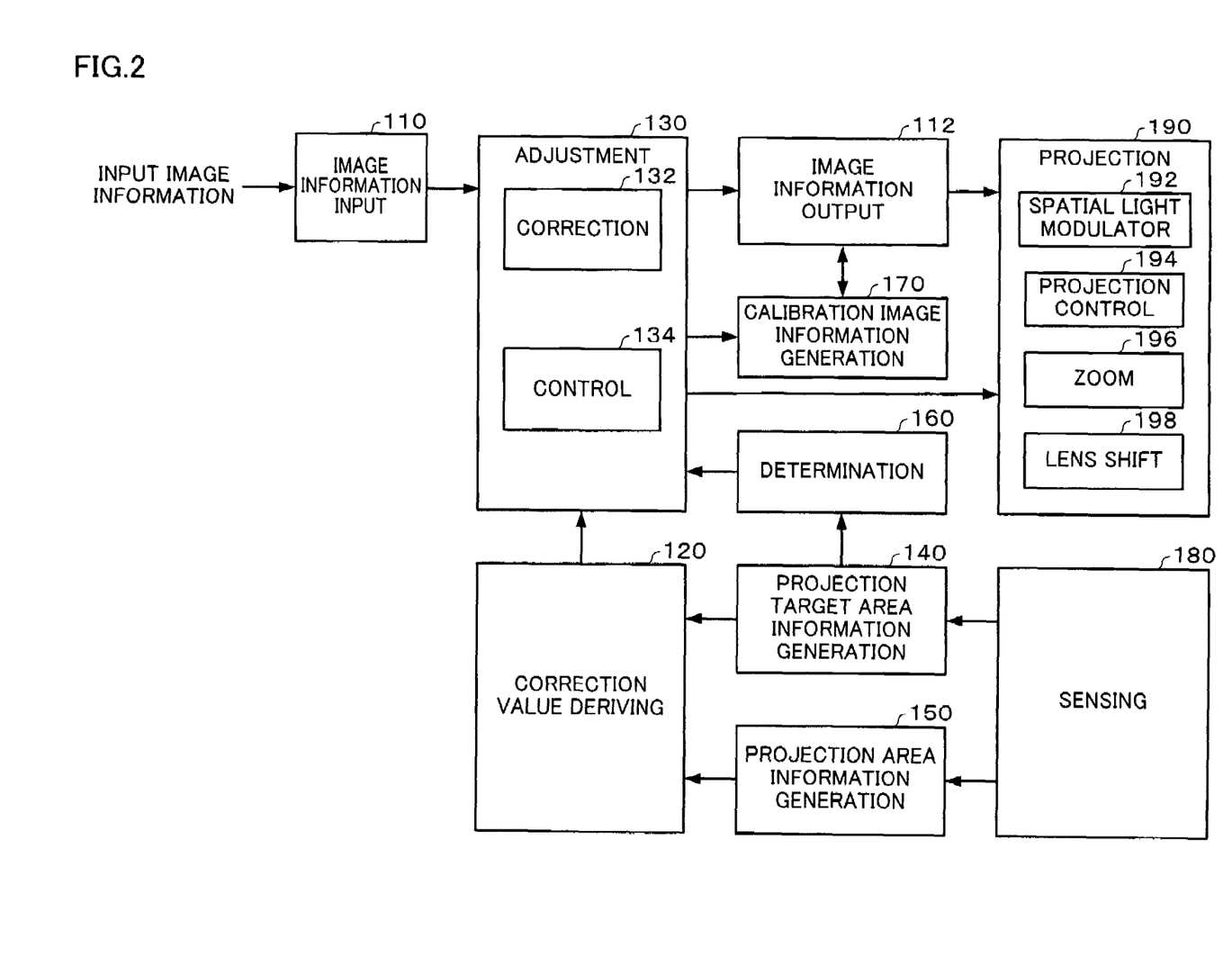
FIG. 2 is a functional block diagram of a projector according to the first embodiment.

FIG. 2 is a functional block diagram of the projector 20 according to the first embodiment.

The projector 20 is configured to include an image information input section 110 to which input image information from a PC or the like is input, an adjustment section 130 which corrects the input image information or the like so that image distortion is corrected, an image information output section 112 which outputs the corrected image information, a projection section 190 which projects an image based on the corrected image information, and a calibration image information generation section 170 which generates calibration image information.

Based on the input image information, the adjustment section 130 generates edit image information for projecting an edit image including a position change detection image at the top, bottom, right, and left outside the content image based on the input image information. The adjustment section 130 is configured to include a correction section 132 which corrects the image information, and a control section 134 which generates control information for the projection section 190.

The projector 20 is configured to include a sensing section 180 which generates sensing information by sensing an area including the projected image 12 (sensing range 8) through a sensing plane, a projection target area information generation section 140 which detects the area of the screen 10 in the sensing area of the sensor 60 based on the sensing information, a projection area information generation section 150 which detects the area of the projected image 12 in the sensing area of the sensor 60, a correction value deriving section 120 which derives a distortion correction value or the like, and a determination section 160 which determines a change in the relative position between the screen 10 and the projector 20. The sensing section 180 includes the sensor 60.

The projection section 190 is configured to include a spatial light modulator 192, a zoom section 196 which adjusts the size of the projected image 12, a lens shift section 198 which adjusts the projection position of the projected image 12, and a projection control section 194 which controls the zoom section 196 or the like.

As hardware for implementing each section of the projector 20, the following hardware may be used, for example.

Figure 3:
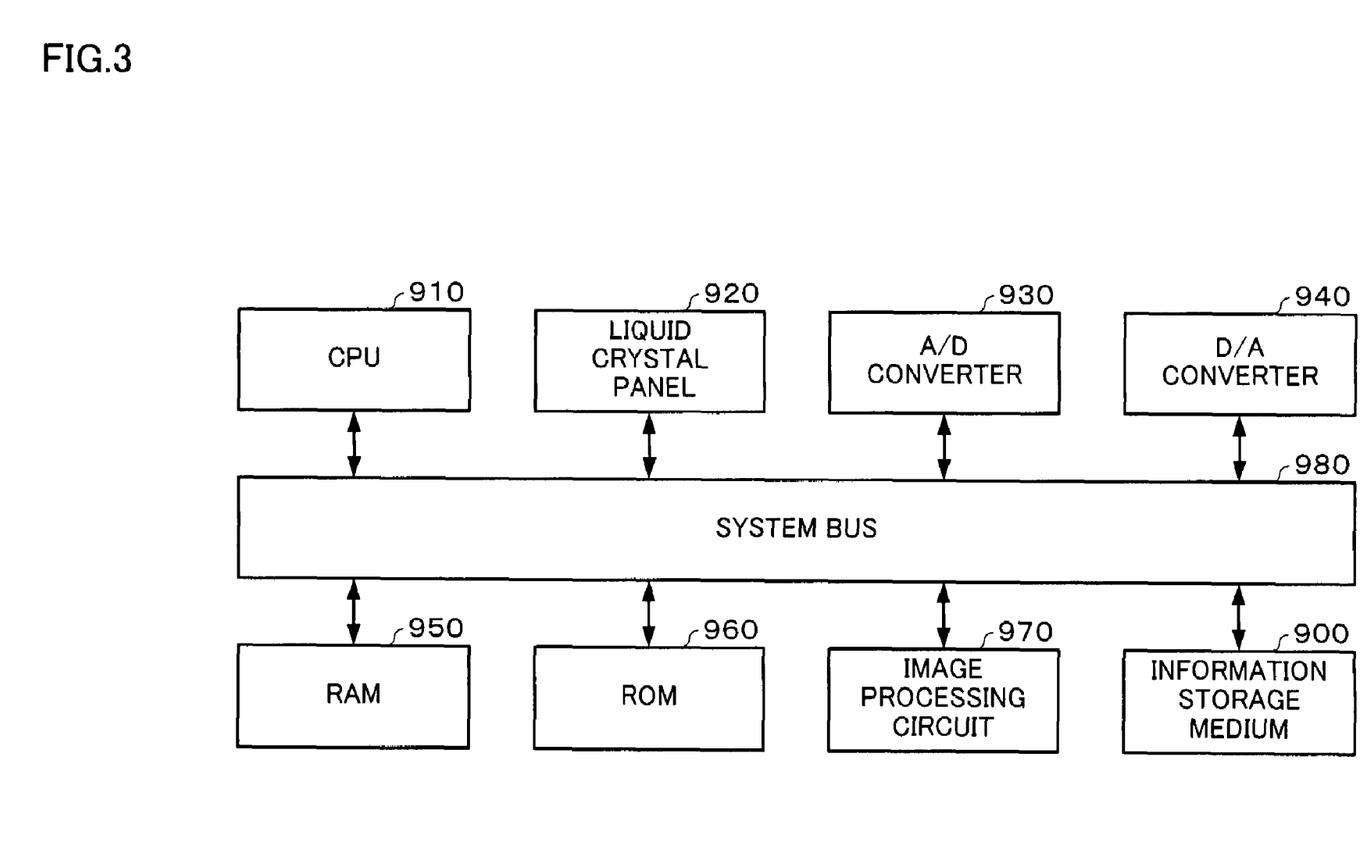
FIG. 3 is a hardware block diagram of the projector according to the first embodiment.

FIG. 3 is a hardware block diagram of the projector 20 according to the first embodiment.

For example, the image information input section 110 may be implemented by using an A/D converter 930 or the like, the adjustment section 130 and the determination section 160 may be implemented by using an image processing circuit 970, a RAM 950, a CPU 910, or the like, the image information output section 112 may be implemented by using a D/A converter 940 or the like, the correction value deriving section 120, the projection target area information generation section 140, the projection area information generation section 150, and the calibration image information generation section 170 may be implemented by using the image processing circuit 970, the RAM 950, or the like, the sensing section 180 may be implemented by using a CCD sensor, a CMOS sensor, an RGB sensor, or the like, and the spatial light modulator 192 may be implemented by using a liquid crystal panel 920, a ROM 960 which stores a liquid crystal light valve driver which drives the liquid crystal panel 920, or the like.

These sections can exchange information through a system bus 980.

A part or the entirety of each section may be implemented by hardware such as a circuit or may be implemented by software such as a driver.

The function of the determination section 160 or the like may be implemented by a computer by causing the computer to read a program for causing the computer to function as the determination section 160 or the like from an information storage medium 900 which stores the program.

As the information storage medium 900, a CD-ROM, DVD-ROM, ROM, RAM, HDD, or the like may be applied. The program read method may be a contact method or a no contact method.

A computer may be caused to execute the above-described processing of each section by downloading a program or the like for causing the computer to execute the above-described processing of each section from a host device or the like through a transmission line instead of reading the program from the information storage medium 900.

The flow of image processing by using each section is described below.

Figure 4:
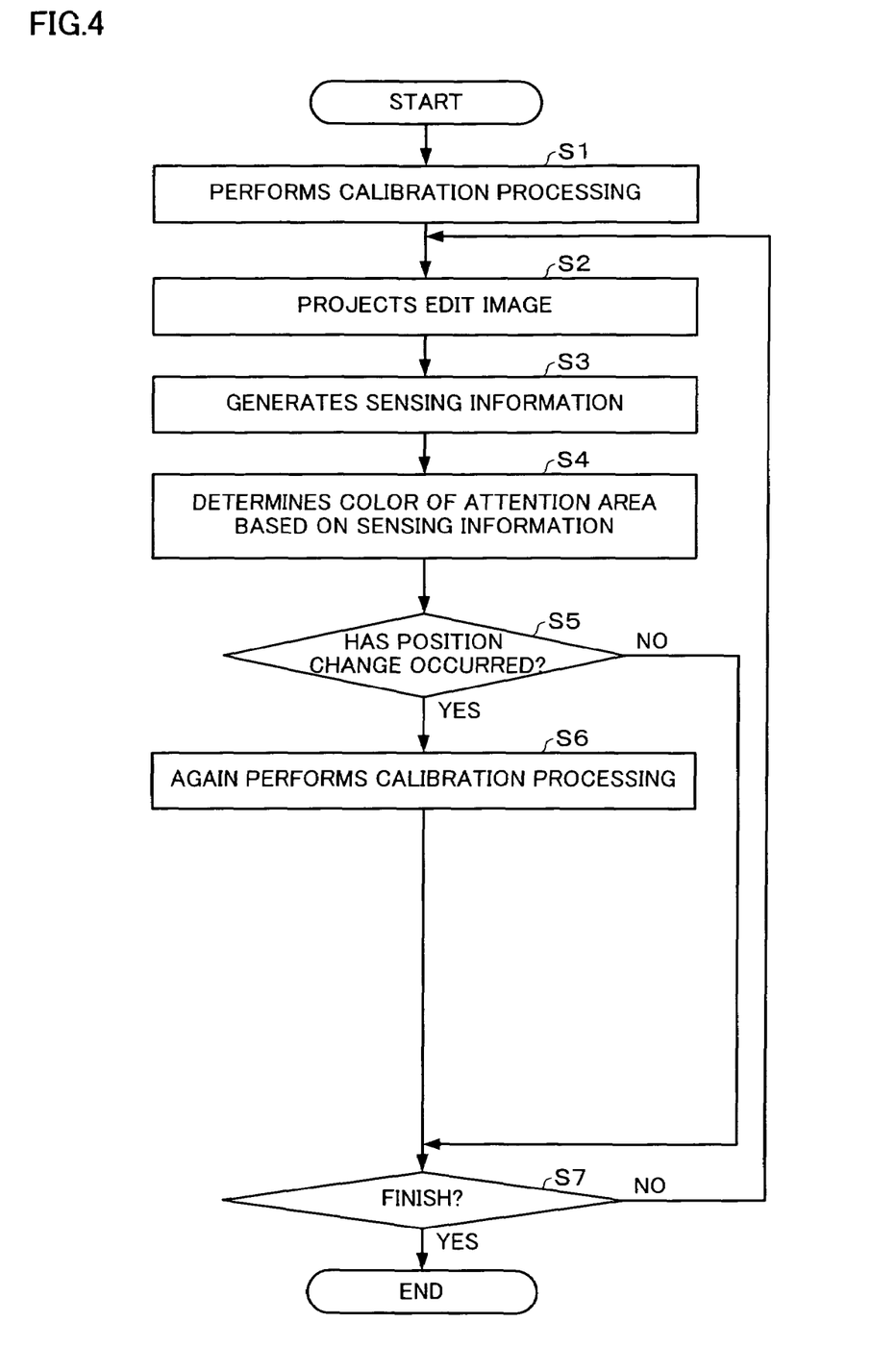
FIG. 4 is a flowchart showing the flow of image processing according to the first embodiment.

FIG. 4 is a flowchart showing the flow of image processing according to the first embodiment.

The projector 20 performs the calibration processing such as keystone distortion correction (step S1). In more detail, the projector 20 performs the calibration processing according to the following procedure, for example.

The calibration image information generation section 170 generates image information for a single-color calibration image which is entirely black (all-black image), and the image information output section 112 outputs a digital signal of the image information to the projection section 190. The projection section 190 projects an all-black image onto the screen 10 based on the digital signal. As a result, the all-black image is displayed on the screen 10.

The sensing section 180 senses an area including the projected image 12 through the sensing plane to generate first sensing information. The sensing information used herein refers to information indicating the luminance value or an image signal value which can generate the luminance value (e.g. XYZ value) in units of pixels of the sensor 60, for example. The XYZ value is an international standard defined by the International Commission on Illumination (CIE), and is one type of image signal value of a device-independent color.

Figure 5:
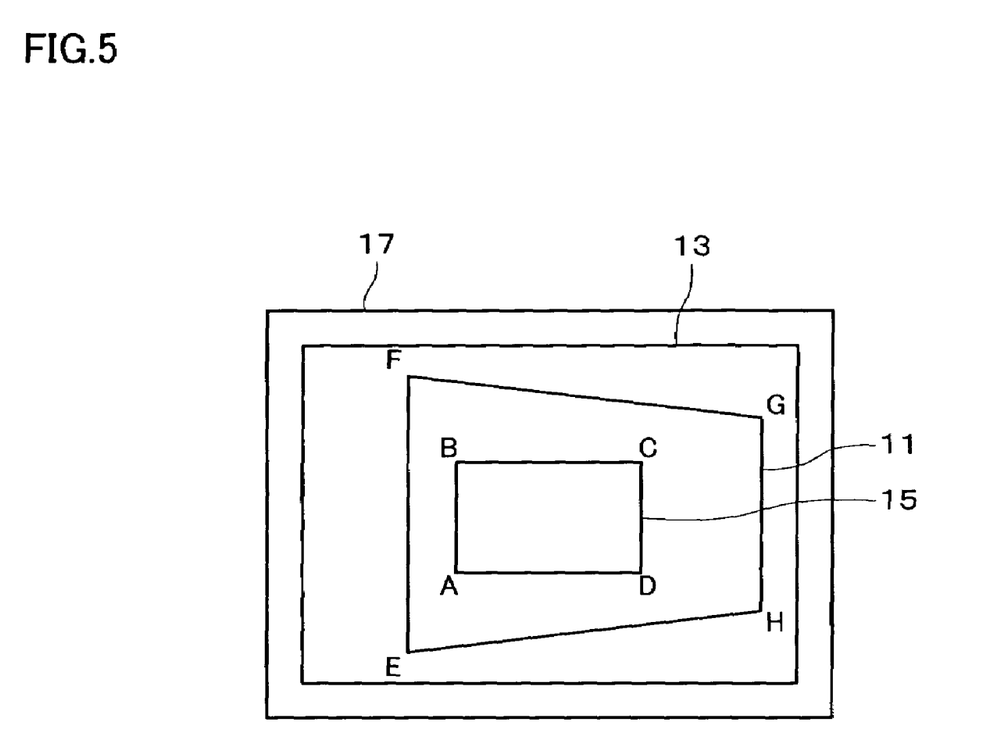
FIG. 5 is a schematic diagram of a sensing area in the first embodiment.

FIG. 5 is a schematic diagram of a sensing area 17 in the first embodiment.

The sensing area 17 is an area corresponding to the sensing plane at which the sensor 60 senses an image, and is an area schematically indicating the sensing information of the sensor 60 in a quadrilateral shape. For example, the sensing area 17 corresponds to the area of the sensing plane of a CCD sensor.

In the first embodiment, the optical axis of the sensor 60 is aligned with the optical axis of the lens 198, and the projector 20 is not positioned perpendicularly to the screen 10. Therefore, as shown in FIG. 5, when viewed from the sensor 60, a projection area 13 which is the area of the projected image 12 is quadrilateral in the same manner as the sensing area 17, and a projection target area 11 which is the area of the screen 10 is distorted.

In the first embodiment, the projection target area information generation section 140 searches for the luminance value radially outward from the intersecting point of the diagonals of the projection area 13, that is, from the center (need not be the center, but may be near the center) of the projection area 13 to determine an area EFGH continuously having a constant luminance value as the projection target area 11, and outputs projection target area information indicating the positions of the four corners of the area EFGH in the sensing area 17 to the correction value deriving section 120.

The calibration image information generation section 170 generates image information for a calibration image in which the center area when equally dividing the entire projected image 12 into nine areas is white and the remaining areas are black (center-white image), and the image information output section 112 outputs a digital signal of the image information to the projection section 190. The projection section 190 projects the center-white image onto the screen 10 based on the digital signal. The sensing section 180 senses the projected center-white image to generate second sensing information.

The projection area information generation section 150 compares the luminance values of the sensed all-black image and the sensed center-white image in pixel units based on the first sensing information and the second sensing information, and extracts an area ABCD having a constant luminance ratio as a center projection area 15. The projection area information generation section 150 outputs projection area information indicating the positions of the four corners of the area ABCD in the sensing area 17 to the correction value deriving section 120.

The correction value deriving section 120 derives the image distortion correction value based on the projection target area information and the projection area information. The correction value deriving section 120 may derive the correction value by using an image distortion correction information deriving method described in Japanese Patent Application No. 2004-78412 as the correction value deriving method, for example.

The adjustment section 130 corrects the image information based on the correction value so that image distortion is corrected. This enables the projection section 190 to project an image of which distortion is corrected. The calibration processing is completed by the above-described procedure. The calibration processing and keystone distortion correction processing are not limited to the above-described methods. Various methods other than the above-described method may be used.

Figure 6:
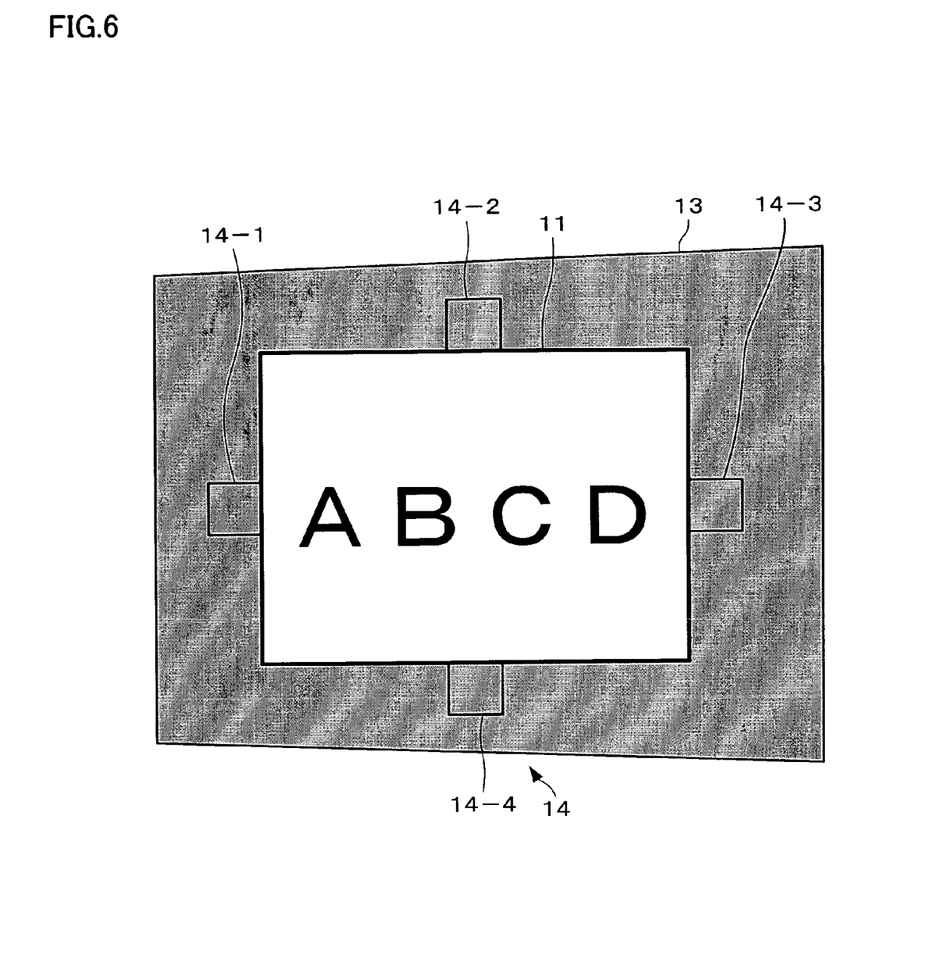
FIG. 6 is a schematic diagram of a sensed image after keystone distortion correction according to the first embodiment.

FIG. 6 is a schematic diagram of the sensed image after keystone distortion correction according to the first embodiment.

After the calibration processing has been completed, the adjustment section 130 generates edit image information for projecting an edit image including a position change detection image, in which the area of the initial projection area 13, in which the content image (image based on the input image information) is not displayed as a result of image information correction, is in an arbitrary color (e.g. red).

The projection section 190 projects the edit image based on the edit image information (step S2).

In the first embodiment, an image of the edit image, other than the content image after keystone distortion correction, is used as the position change detection image. The position change detection image is an image for detecting a change in the relative position between the screen 10 and the projector 20. In FIG. 6, the white rectangular area including characters A, B, C, and D is the area of the content image, the black area around the area of the content image is the area of the position change detection image, and the area including the area of the content image and the area of the position change detection image is the projection area 13 (area of the edit image).

For example, when the aspect ratio of the screen 10 and the desired aspect ratio are 4:3, the content image is displayed to coincide with the screen 10 by keystone distortion correction, as shown in FIG. 6, and an area other than the screen 10 is displayed in red. Since an object which reflects the projection light of the projected image 12 does not exist behind the screen 10, only the content image reflected on the screen 10 is sensed by the user and the sensor 60.

After the calibration processing has been completed, the determination section 160 sets attention areas 14-1 to 14-4 for detecting a position change at the top, bottom, right, and left outside the content image (i.e. projection target area 11) in the sensing area 17.

The sensing area 17 is originally displayed as shown in FIG. 5. However, FIGS. 6 to 10 show a state when sensing the sensing area 17 perpendicularly to the screen 10 for convenience of description.

The sensing section 180 senses the area including the screen 10 onto which the edit image is projected to generate sensing information (step S3).

The determination section 160 determines the color of the attention area 14 in the sensed image based on the sensing information (step S4).

The determination section 160 determines whether or not a position change has occurred by determining whether or not the color of the attention area 14 is red (step S5).

Figure 7:
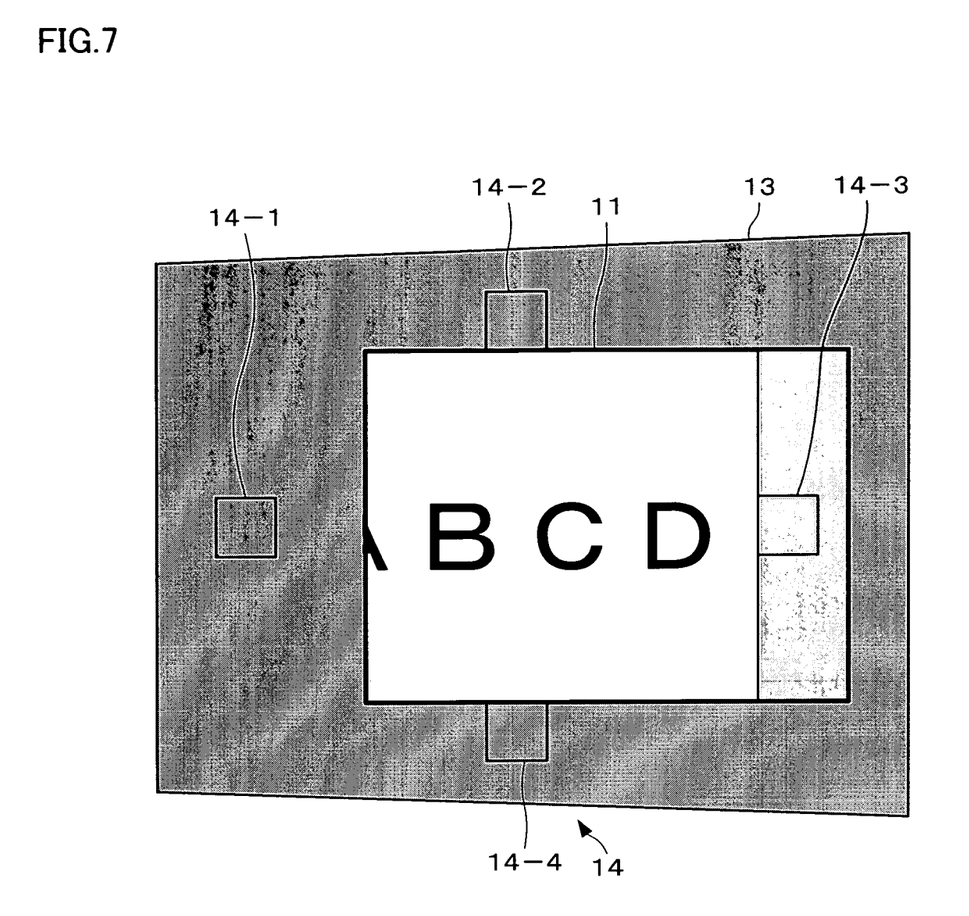
FIG. 7 is a schematic diagram of a sensed image after movement according to the first embodiment.

FIG. 7 is a schematic diagram of the sensed image after movement in the first embodiment.

For example, when the screen 10 has moved to the right when viewed from the sensor 60, the right part of the position change detection image is projected onto the screen 10, as shown in FIG. 7. Therefore, this part is also included in the sensed image. As a result, the red position change detection image is reflected on the screen 10, so that the area including the attention area 14-3 in the sensed image is displayed in red.

In this case, the determination section 160 determines that a position change has occurred by detecting red in the attention area 14-3.

When the position change has occurred, the projector 20 again performs the calibration processing in the step S1 (step S6).

When the image processing has not been completed (step S7), the projector 20 repeatedly performs the processing in the steps S2 to S7.

This enables the projector 20 to always project an appropriate image by always determining the presence or absence of a position change and performing image distortion correction or the like when the position change has occurred.

As described above, according to the first embodiment, the projector 20 can simply and promptly detect a change in the relative position between the screen 10 and the projector 20 by projecting the position change detection image in addition to the normal content image and determining the presence or absence of the position change detection image in the attention area 14.

Specifically, since the projector 20 does not require a memory for retaining the sensing information before one time unit and processing using a differential image by utilizing reflection on the screen 10, the projector 20 can more efficiently perform the image processing.

According to the first embodiment, the projector 20 can determine the external shape of the projection target (e.g. screen 10) based on the difference in image signal value (e.g. luminance value) based on the sensing information.

According to the first embodiment, even when the calibration image 12 is projected larger than the screen 10, the projector 20 can determine the shape of the projected image 12 or the like by using the center-white image.

According to the first embodiment, the projector 20 can automatically correct image distortion based on the determined shape of the screen 10 and the projected image 12.

According to the first embodiment, since the projector 20 is rarely affected by an obstacle on the screen 10 by comparing the luminance value from the center toward the outside when detecting the projection target area 11, the projector 20 can more accurately detect the projection target area 11.

Second Embodiment

In the first embodiment, the determination section 160 sets the attention area 14 outside the projection target area 11. However, the determination section 160 may set the attention area 14 inside the projection target area 11.

Figure 8:
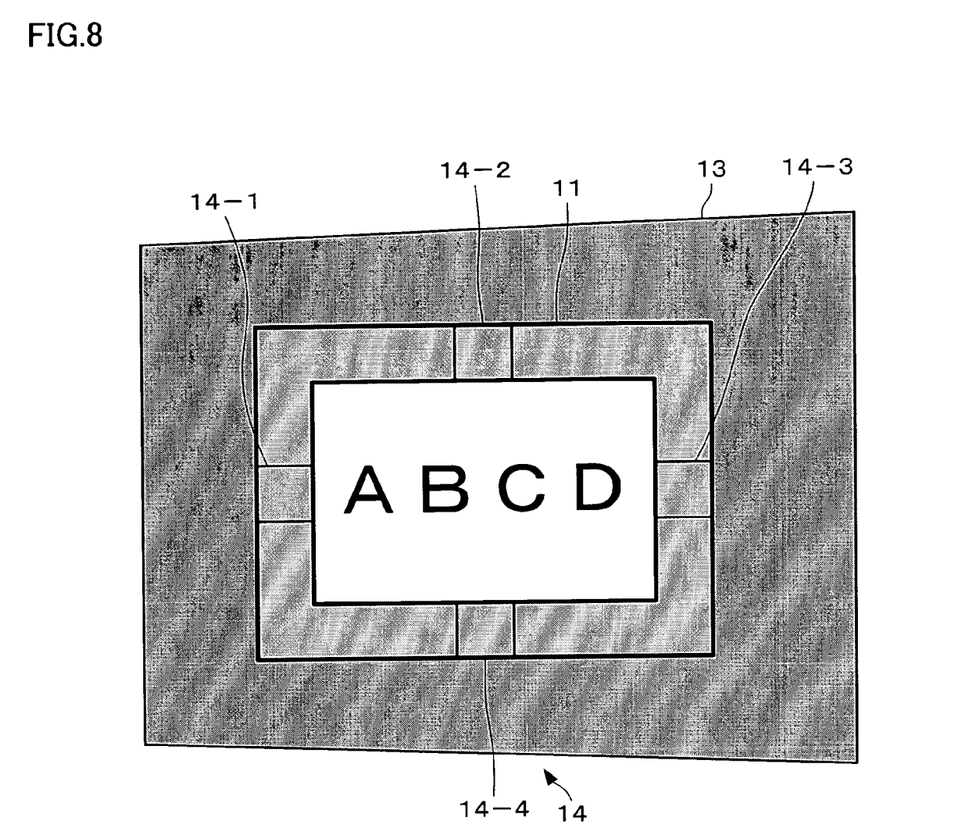
FIG. 8 is a schematic diagram of a sensed image after keystone distortion correction according to a second embodiment.
Figure 9:
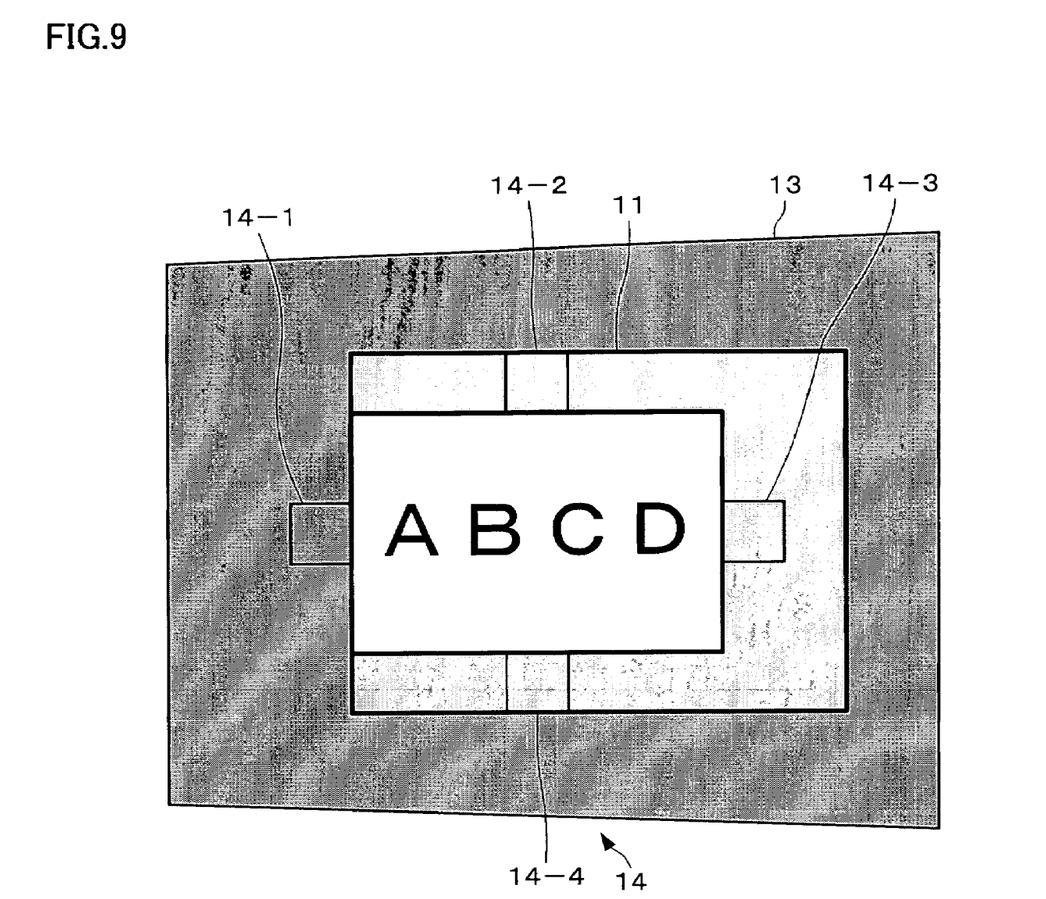
FIG. 9 is a schematic diagram of a sensed image after movement according to the second embodiment.

FIG. 8 is a schematic diagram of a sensed image after keystone distortion correction according to a second embodiment. FIG. 9 is a schematic diagram of the sensed image after movement according to the second embodiment.

As shown in FIG. 8, the correction section 132 corrects the image information so that the content image is displayed in an area smaller than the screen 10 (projection target area 11) and the position change detection image is displayed around the content image.

The determination section 160 determines that the screen 10 or the projector 20 has not moved when the red position change detection image exists in the attention area 14. As shown in FIG. 9, when the screen 10 has moved to the right, the attention area 14-1 at the left of the content image is positioned outside the screen 10. In this case, since the determination section 160 cannot detect red (position change detection image) in the attention area 14-1, the determination section 160 determines that the screen 10 has moved to the right.

The attention area 14 may be provided inside the projection target area 11 as in the second embodiment. The determination section 160 may determine that the screen 10 has moved when the position change detection image does not exist in the attention area 14.

The above-described method also enables the projector 20 to simply and promptly detect a change in the relative position between the screen 10 and the projector 20 by projecting the position change detection image in addition to the normal content image and determining the presence or absence of the position change detection image in the attention area 14.

Third Embodiment

In the above-described embodiments, it is necessary to again perform the calibration processing. However, even when the screen 10 has moved, the projector 20 can display the content image on the screen 10 by adjusting the size of the projected image 12 without again performing the calibration processing.

Figure 10:
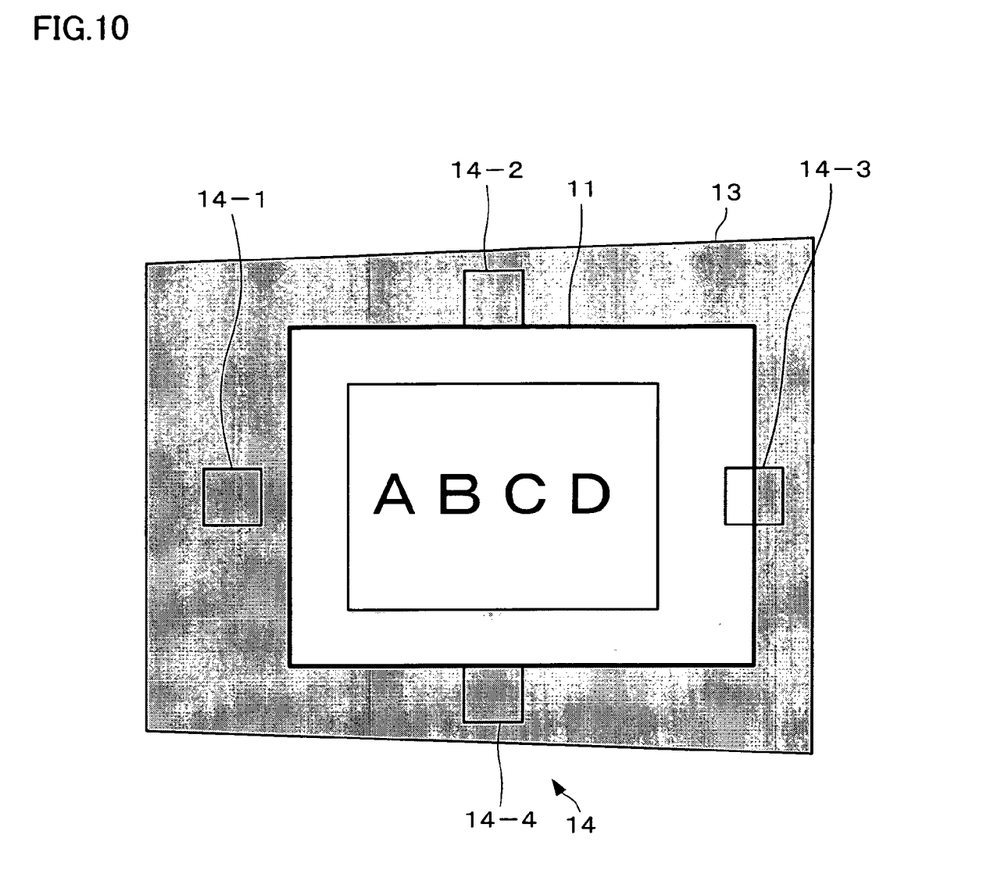
FIG. 10 is a schematic diagram of a sensed image after movement according to a third embodiment.

FIG. 10 is a schematic diagram of a sensed image after movement according to a third embodiment.

For example, when the screen 10 has moved to the right in a state as shown in FIG. 6, a part of the content image cannot be seen as shown in FIG. 7. Therefore, the projector 20 reduces the size of the projected image 12.

In more detail, the determination section 160 determines the adjustment value of the zoom section 196 corresponding to the percentage of the attention area 14-3 occupied by the position change detection image. Since the above percentage increases as the amount of movement of the screen 10 increases, the determination section 160 determines the adjustment value so that the reduction ratio is increased (i.e. the projected image 12 becomes smaller) as the above percentage increases.

The control section 134 generates the control information based on the adjustment value, and outputs the control information to the projection section 190. The projection control section 194 controls the zoom section 196 based on the control information.

As a result, the content image is reduced, and projected onto the screen 10 as shown in FIG. 10.

As described above, according to the third embodiment, even when the screen 10 has moved, the projector 20 can display the content image on the screen 10 without again performing the calibration processing.

The projector 20 may change the position of the projected image 12 in addition to the size of the projected image 12 by using similar processing. In more detail, the projector 20 may adjust the projection position by controlling the lens shift section 198.

Modification

The invention is not limited to the above-described embodiments. Various modifications and variations may be made.

In the third embodiment, the projector 20 reduces the projected image 12 by means of hardware. However, the projector 20 may reduce the projected image 12 by means of software by correcting the image information.

When the screen 10 has moved, the projector 20 may notify the user that the screen 10 has moved by projecting a message image for the user. For example, when the screen 10 has moved to the right, the projector 20 may project a message image indicating "Screen 10 has moved to the right. Move the screen to the left.", "Screen 10 has moved to the right. Move the projector to the right.", or the like. A notification section which notifies the user that the screen 10 has moved by using sound or light may be provided in the projector 20 instead of the notification section which displays the message image.

This enables the projector 20 to issue appropriate indication to the user, so that it is unnecessary for the projector 20 to again perform the calibration processing.

The projection target is not limited to the screen 10. Various projection targets which reflect an image may be used. For example, a whiteboard, a balloon, or the like may be used as the projection target. Specifically, the invention may be applied to the case of projecting an image onto a balloon for advertisement, for example.

The aspect ratio of the screen 10 need not coincide with the desired aspect ratio. For example, when the screen 10 has a longer side in comparison with the desired aspect ratio, the adjustment section 130 may use an edit image in which the blank area on each end of the content image is black and the area positioned outside the screen 10 is red.

In the above-described embodiments, the position change detection image is provided around the content image. However, the position change detection image may be provided only at the top and bottom or the right and left outside the content image, or may be provided only in a part of the area outside the content image.

In the above-described embodiments, the determination section 160 determines the presence or absence of a position change depending on the color of the attention area 14. However, the determination section 160 may determine the presence or absence of a position change depending on the luminance values of all the pixels making up the attention area 14, the average value of the luminance values of all the pixels, or the like.

The configuration of the projector 20 is not limited to the example shown in FIG. 2. For example, the adjustment section 130 may be provided with the function of only one of the correction section 132 and the control section 134.

In the above-described embodiments, the projected image 12 is equally divided into nine areas, and the center area is used as the reference. However, the size and the position of the center area may be arbitrary insofar as the projector 20 can sense the center area of the projected image inside the screen 10.

In the above-described embodiments, the projector 20 detects a change in the position of the screen 10. However, a change in the position of the projector 20 may be detected.

The determination section 160 may set the attention areas 14 outside and inside the projection target region 11.

In the above-described embodiments, the projector 20 is used as the image processing system. However, a projection type display device other than the projector 20 may also be used.

As the projector 20, a liquid crystal projector, a projector using a digital micromirror device (DMD), or the like may be used. DMD is a trademark of Texas Instruments, Inc. (U.S.A.).

The above-described functions of the projector 20 may be implemented by only the projector, or may be distributed over a plurality of processing devices (e.g. distribution processing by the projector and the PC).

Although only some embodiments of the invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. An image processing system, comprising:
   an adjustment section which generates edit image information for projecting an edit image including a content image based on input image information and a position change detection image at least partially provided outside the content image;
   a sensing section which senses a projection target onto which the edit image is projected and generates sensing information indicating a sensed image;
   a projection section which projects the content image based on the input image information and projects the edit image based on the edit image information; and
   a determination section which determines whether or not a relative position between the projection section and the projection target has changed based on the sensing information, the determination section determining whether or not the relative position has changed by determining the presence or absence of the position change detection image in a projection target area corresponding to the projection target in the sensed image.

2. The image processing system as defined in claim 1,
   wherein the position change detection image is provided at top, bottom, right, and left outside the content image; and
   wherein the determination section determines at least one of a moving direction and an amount of movement of the relative position based on a detection state of the position change detection image in the sensed image.

3. The image processing system as defined in claim 1, comprising:
   a projection target area information generation section which generates projection target area information on a position of the projection target area in the sensed image based on a difference in image signal value in pixel units in the sensed image, wherein the determination section determines whether or not the relative position has changed based on the sensing information and the projection target area information.

4. The image processing system as defined in claim 3, wherein, when the determination section has determined that the relative position has changed, the adjustment section adjusts at least one of a correction amount of the input image information and a control amount of a projection control section included in the projection section based on the determination result of the determination section.

5. The image processing system as defined in claim 4, comprising:

a projection area information generation section which generates projection area information on a position of a projection area corresponding to the image in the sensed image based on the difference in the image signal value in pixel units in the sensed image; and a correction value deriving section which derives a correction value for distortion of the image on the projection target based on the projection target area information and the projection area information, wherein the adjustment section adjusts at least one of the correction amount and the control amount based on the correction value so that distortion of the image is corrected.

6. The image processing system as defined in claim 1, comprising:

a notification section which notifies a user that the relative position has changed by using at least one of an image, sound, and light when the determination section has determined that the relative position has changed.

7. A projector comprising the image processing system as defined in claim 1.

8. A computer-readable medium comprising a computer program executed by a computer, the computer including a sensing section, a projection section, and a determination section, the program causing the computer to perform processing for:

the projection section to project an image including a position change detection image at least partially provided outside a content image based on input image information;

the sensing section to sense a projection target onto which the image is Projected and to generate sensing information indicating a sensed image; and the determination section to determine whether or not a relative position between the projection section and the projection target has changed based on the sensing information, the sensing section sensing the projection target in a sensing range including the projection target area; and the determination section determining whether or not the relative position has changed by determining the presence or absence of the position change detection image in a projection target area corresponding to the projection target in the sensed image.

9. An image processing method, comprising:

projecting an image including a position change detection image at least partially provided outside a content image based on input image information;

sensing a projection target onto which the image is projected and generating sensing information indicating a sensed image; and determining whether or not a relative position between a projection section and the projection target has changed based on the sensing information, sensing the projection target in a sensing range including the projection target area; and determining section determines whether or not the relative position has changed by determining the presence or absence of the position change detection image in a projection target area corresponding to the projection target in the sensed image.

* * * * *